United States Patent [19]

Ackerman et al.

[11] 4,074,993
[45] Feb. 21, 1978

[54] POTASSIUM ION-EXCHANGE ON SURFACE OF BETA-SPODUMENE

[75] Inventors: Roger G. Ackerman, Corning; Bruce R. Karstetter, Painted Post, both of N.Y.

[73] Assignee: Corning Glass Works, Corning, N.Y.

[21] Appl. No.: 714,013

[22] Filed: Mar. 18, 1968

Related U.S. Application Data

[63] Continuation-in-part of Ser. No. 365,177, May 5, 1964, abandoned.

[51] Int. Cl.² .................. C03C 3/22; C03C 21/00
[52] U.S. Cl. .................................. 65/30 E; 65/33; 106/39.7
[58] Field of Search .................. 65/30, 33, 30 E; 106/39, 39.7

[56] References Cited

U.S. PATENT DOCUMENTS

| | | | |
|---|---|---|---|
| 2,779,136 | 1/1957 | Hood et al. | 65/30 X |
| 3,218,220 | 11/1965 | Weber | 65/30 X |
| 3,282,770 | 11/1966 | Stookey et al. | 65/30 X |
| 3,482,513 | 2/1969 | Denman | 65/33 X |

OTHER PUBLICATIONS

Kistler, S. S., "Stresses in Glass Produced by Non Uniform Exchange of Monovalent Ions", J. of Am. Cer. Soc., vol. 45, No. 2, pp. 59–68, Feb. 1962.

*Primary Examiner*—Richard V. Fisher
*Attorney, Agent, or Firm*—Clinton S. Janes, Jr.; Clarence R. Patty, Jr.

[57] ABSTRACT

This invention relates to the strengthening of glass-ceramic articles wherein the crystal content thereof comprises the predominant portion and containing beta-spodumene solid solution as the principal crystal phase. The strengthening effect is accomplished through an ion exchange process taking place within a surface layer of the article such that potassium ions from an external source are exchanged for lithium ions in the crystal phase thereby causing compressive stresses to be set up in the surface layer.

4 Claims, No Drawings

POTASSIUM ION-EXCHANGE ON SURFACE OF BETA-SPODUMENE

This application is a continuation-in-part of our pending application, Ser. No. 365,177, filed May 5, 1964 and now abandoned.

The manufacture of glass-ceramic articles contemplates the carefully controlled crystallization of a glass article in situ. Hence, a glass-forming batch usually containing a nucleating agent is melted, this melt is then simultaneously cooled to a glass and an article of desired dimensions shaped therefrom, and, subsequently, this glass article is exposed to a particular heat treatment schedule which first causes the development of nuclei in the glass that provide points for the growth of crystals thereon as the heat treatment is continued.

Because the crystallization is founded upon the substantially simultaneous growth on essentially innumerable nuclei, the body of a glass-ceramic article is composed of relatively uniformly-sized, fine-grained crystals homogeneously dispersed in a glassy matrix with the crystals comprising the predominant portion of the article. Glass-ceramic articles are normally greater than 50% by weight crystalline and, frequently, are actually more than 90% by weight crystalline. Since glass-ceramic articles are usually very highly crystalline, the chemical and physical properties thereof are normally quite different from those of the parent glass and more nearly approximate those exhibited by crystalline articles.

An extensive study of the theoretical considerations and the practical aspects inherent in the production of glass-ceramic articles along with a discussion of the crystallization mechanism involved can be found in U.S. Pat. No. 2,920,971 and reference is hereby made thereto for further explanation of these factors. As will be readily understood, the crystal phases developed in glass-ceramic articles are dependent upon the composition of the original glass and the heat treatment to which the glass is subjected. Glass-ceramic articles containing beta-spodumene as the predominant crystal phase are described in the above patent.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, MgO, CaO, BaO, etc.) some of the shared corners (Si-O-Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange", as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitution in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion and density changes.

Chemical alteration in situ of the crystal phase in a glass-ceramic material by ion exchange is generally disclosed and claimed in an application filed May 5, 1964, Ser. No. 365,117, since abandoned and re-filed Dec. 19, 1968 as Ser. No. 784,635 in the name of R. O. Voss, entitled "Glass-Ceramic Article and Method" and assigned to a common assignee. In addition to its general disclosure regarding ion exchange in a glass-ceramic material, the Voss application further specifically discloses the strengthening of a glass-ceramic article having a beta-spodumene crystal phase by exchanging the lithium ion of such crystal phase for a sodium ion within a surface layer on the article to develop compressive stress within such surface layer.

We have found that an exchange between potassium and lithium ions in a glass-ceramic material having a beta-spodumene crystal phase does in fact occur. However, we have found that an effective degree of exchange for strengthening purposes can only be attained within a reasonable time (i.e. within about 16 hours or less) by employing considerably higher temperatures than are customarily employed for the corresponding sodium-for-lithium ion exchange. In turn, however, we have found that a beta-spodumene glass-ceramic article strengthened by a potassium ion exchange provides a distinct advantage with respect to thermal retention, or conversely thermal decay, of the strengthening effect. The potassium-for-lithium ion exchange is uniquely different from the sodium-for-lithium exchange in this respect.

A very satisfactory degree of strengthening is attainable by exchanging sodium for lithium ions in materials characterized by a beta-spodumene crystal phase. However, it has been found that such strengthening may be lost when the article is exposed to, or operated at, elevated temperatures. Thus, if a beta-spodumene glass-ceramic article that has been strengthened by sodium-for-lithium ion exchange is subjected to a continuous heating at temperatures of about 400° C., the increase in strength of the article is reduced by a factor of 3 within about 100 hours. Consequently, the use of such strengthening procedure is limited to articles whose operational use will necessarily be within such thermal limitation, or in which the loss of strength can be tolerated. The desirability of a strengthening technique that would extend upward the temperature limit on potential service operations is obvious. We have found now that, by exchanging potassium ions for lithium, this need is met and a strengthened article can be produced that is capable of being used at temperatures on the order of 200° C. higher than articles similarly exchanged with sodium ions.

Our invention then resides in a glass-ceramic article having a beta-spodumene crystal phase and being characterized by an integral surface layer wherein the lithium ions in at least a portion of the beta-spodumene crystals is replaced by potassium ions, thereby inducing compressive stresses in the surface layer and increasing the mechanical strength of the article. It further resides in a method of treating a glass-ceramic article characterized by a beta-spodumene crystal phase in order to impart to the article an increased mechanical strength that is resistant to thermal release at temperatures on the order of 500°–600° C., the method comprising exchanging a potassium ion for the lithium ion in at least a portion of the crystals in a surface layer on the article.

The term "beta-spodumene" has been used to designate a crystal that is now known to be in the tetragonal system, that has the formula $Li_2O.Al_2O_3.4SiO_2$ and that is a high temperature form of alpha-spodumene formed by heating the latter to a conversion temperature on the order of 700° C. Likewise, the term "beta-eucryptite" has been used to designate a crystal in the hexagonal system that has the formula $Li_2O.Al_2O_3.2SiO_2$ and is a high temperature form of alpha-eucryptite. In lithium-aluminum-silicate glass-ceramic materials, however, the crystal phase does not strictly conform to either of such naturally occurring crystals. Rather, it is more in the nature of a solid solution corresponding generally to the formula $Li_2O.Al_2O_3.nSiO_2$ where "$n$" may vary from about 2 up to 7 or more depending on the silica content of the parent glass. Also, there is evidence to indicate that, when other ions such as magnesium are present in the parent glass, they may appear in the crystal phase to some extent without altering the basic eucryptite or spodumene crystal structure. Thus, the characteristic geometric pattern of the crystal, as shown by X-ray diffraction pattern analysis, invariably falls in either the hexagonal or tetragonal system. Accordingly, it has become customary, in identifying glass-ceramics, to essentially disregard stoichiometry and to term those lithium-aluminum-silicate crystal phases that are classifiable in the hexagonal system as beta-eucryptite crystal phases and those that are classifiable in the tetragonal system as beta-spodumene crystal phases. That practice is followed here.

Where the oxide stoichiometry in the crystal in such that the coefficient "$n$" is less than about 3.5 in the formula $Li_2O.Al_2O_3.nSiO_2$, a stable beta-eucryptite type crystal phase is observed. With larger proportions of silica ("$n$" from about 3.5 up to 7 and higher), a beta-eucryptite type crystal develops initially at temperatures of about 900° C. but is of a metastable nature. This means that it transforms into a beta-spodumene type crystal when heat treated at higher temperatures on the order of 900°–1150° C. In general, lithium-aluminum-silicate glass-ceramic materials do not lend themselves to strengthening when the crystal phase is of the metastable beta-eucryptite form, but readily strengthen when the crystal phase is of the beta-spodumene type, that is classifiable in the tetragonal system.

X-ray diffraction pattern analysis indicates that substitution of a potassium ion for lithium in a beta-spodumene crystal leads to obvious distortion of the spodumene structure, as one would expect from considerations of the difference in size between the potassium and lithium ions. Whereas the sodium for lithium substitution leads only to subtle changes in the X-ray diffraction pattern, the potassium for lithium substitution shows striking changes in the positions and relative intensities of the characteristic peaks. The latter exchange also results in formation of a new minor phase. There is an apparent shift in the beta-spodumene diffraction lines to larger d-spacings indicating some expansion of the lattice. In addition, the low density polymorph of silica, cristobalite, is formed. The crystalline phase assemblage present after ion exchange, normally being lower in density or higher in specific volume than the original material, would be expected to cause surface compression.

The invention may be practiced with any glass-ceramic article having a beta-spodumene type crystal phase and is not otherwise limited with respect to the composition of, or the manner of initially producing, the glass-ceramic article. In general, glass-ceramic articles having a beta-spodumene crystal phase may be produced by initially forming a corresponding glass article from a glass composed essentially of the oxides of $Li_2O$, $Al_2O_3$, and $SiO_2$, these oxides being so proportioned in the glass composition as to permit subsequent formation of a beta-spodumene crystal phase from the glass. Glass compositions corresponding to the formula $Li_2O.Al_2O_3.nSiO_2$ with a slight excess of $Al_2O_3$ and with "n" ranging from 3.5 to about 7 are known to be suitable for the purpose.

Beta-spodumene is isostructural with and is a stuffed derivative of the silica polymorph, keatite. Beta-spodumene is derived through the replacement of some of the silicon atoms with aluminum atoms, the electrical neutrality being maintained by the insertion of lithium ions into interstices in the cell framework. The amount of aluminum-for-silicon substitution can vary widely and the crystal structure is capable of a broad range of other substituent cations such as magnesium and zinc ions.

As described by B. J. Skinner and H. T. Evans, Jr., "Crystal Chemistry of $\beta$-Spodumene Solid Solutions on the Join $Li_2O.Al_2O_3$-$SiO_2$", American Journal of Science, Bradley Volume, Vol. 258-A, 1960, pp. 312–324, the beta-spodumene structure consists of a network arrangement of twelve $SiO_4$ tetrahedra in a tetragonal unit cell. Eight of these tetrahedra form spiral chains about fourfold screw axes in the centers of the lateral faces of the unit cell, while the remaining four tetrahedra lie on a horizontal diagonal twofold rotary axes, cross-linking the spiral chains. The aluminum atoms are thought to substitute for silicon atoms at random positions within the structure whereas the lithium ions can go into the structure either in an eightfold general position or a fourfold special position on the rotary axes. A careful study of the beta-spodumene structure shows that these cation positions are connected by channels which extend continuously thoughout the structure. These channels provide means for movement of the lithium ions under the influence of a chemical or physical potential such as a bath of molten potassium salt.

The selected glass is melted and articles formed therefrom in accordance with conventional practice for such an aluminosilicate glass. The glass article is cooled below about 700° C., and preferably to ambient temperature for inspection. Thereafter, it is brought to a temperature of about 700° C., for example by heating in a furnace or kiln. Customarily, a nucleating agent such as titania is included in an amount of several percent in the glass composition, and the glass is thermally treated within a temperature range in a controlled manner to effect nucleation, that is to provide a mechanism for development of a fine-grained crystal phase throughout the glass body. In titania containing glasses, the nucleating temperature range is generally about 700°–800° C., and the glass is either heated slowly through this range, or held for a period of time at some temperature within this range, to permit an adequate degree of nucleation.

Following nucleation, the glass is then heated rapidly to a higher temperature, preferably about 1100° C., and held at such temperature for a sufficient time to permit substantial development of the desired beta-spodumene crystal phase, normally producing an article greater than about 70% by weight crystalline. As indicated earlier, a metastable beta-eucryptite crystal phase may separate initially and then convert to the beta-spodumene phase with additional heat treatment.

The beta-spodumene glass-ceramic article thus produced contains within its crystal phase lithium ions which have been found to be exchangeable with certain ions of larger ionic radius. This means that the ions involved in the exchange are capable of migrating or diffusing in depth under a chemical force such as is supplied by a differential ion concentration or under a physical force such as heat and/or electrical potential which are controllable by the application or removal of such forces or attainment of an equilibrium.

In accordance with the present invention, a portion of the lithium ions of the beta-spodumene solid solution in a surface layer on the glass-ceramic article is replaced by potassium ions. This chemical change in the crystal composition with the accompanying changes in the surface phase assemblage described above results in the development of compressive stresses in the modified surface layer with consequent increase in the mechanical strength of the article. The replacement of the small-diameter lithium ions with larger-diameter potassium ions is on a one-for-one basis such that the total concentration of alkali metal ions molarwise is the same before and after the ion exchange. Therefore, it can be appreciated that the concentration of potassium ions in the surface layer will be much greater than in the interior portion with the opposite situation holding with respect to the lithium ion concentrations. These differences in the potassium and lithium ion concentrations produce the desired compressive stresses.

To effect the desired substitution or replacement of ions, any convenient source of potassium ions is brought into intimate contact with the surface of the glass-ceramic article at a suitable temperature for ion exchange and maintained in such contact for a time sufficient to effect the desired degree of ion exchange. In general, the exchange appears to be diffusion controlled so that the amount of exchange increases with the square root of time, and the time for a given amount of exchange correspondingly decreases with increase in temperature.

While not so limited, it is convenient to use a molten potassium salt bath and to immerse the glass-ceramic article in such bath to effect intimate contact between the potassium ions and the article surface. In order to achieve a useful degree of exchange between potassium and lithium ions within a reasonable time, it has been found necessary to effect the exchange at temperatures above about 550° C. and preferably within the range of 700°–800° C. A potassium nitrate ($KNO_3$) bath may be used at temperatures up to about 600° C., but the salt tends to decompose rather rapidly at such temperature. This may result in severe attack on the surface of the article being treated, on the salt container, and on the handling equipment. Furthermore, even at 600° C. the ion exchange proceeds rather slowly.

Chloride salts generally tend to be highly corrosive of glass and glass-ceramic surfaces, particularly at such elevated temperatures. However, we have found that a mixture of the chloride and sulfate salts of potassium is especially effective for present purposes. This mixture forms a eutectic at about 52% KCl and 48% $K_2SO_4$ that melts at about 690° C. Salt bath compositions may generally be varied over a range of about 50–60% KCl and 40–50% $K_2SO_4$ depending on the particular temperature of operation, but the indicated eutectic mixture is obviously the most flexible for general use.

It has been found that at temperatures above about 800° C. an as yet undefined stress-release mechanism becomes operative within the ion exchanged crystal phase of the surface layer whereby no effective strengthening of the article is obtained. This places an upper limit of about 800° C. on the present ion exchange treatment for strengthening purposes, the lower practical limit being about 550° C. as earlier indicated.

Our invention is not limited to the manner in which the glass-ceramic article is produced but is generally applicable to the strengthening of any glass-ceramic article having beta-spodumene as the principal crystal phase. Nevertheless, for highly strengthened articles, we prefer to utilize compositions consisting essentially of $Li_2O$, $Al_2O_3$, and $SiO_2$ wherein $TiO_2$ and/or $ZrO_2$ provide the nucleation. Eminently suitable articles have been formed from compositions consisting essentially, by weight on the oxide basis, of about 60–75% $SiO_2$, 10–25% $Al_2O_3$, 1–5% $Li_2O$, and 3–10% $TiO_2$.

To more specifically illustrate the invention, and especially the unique nature of the strengthening thus obtained, the following specific embodiment is described:

Raw materials were mixed to form a glass batch having the following oxide composition on a calculated weight percent basis: $SiO_2$ 69.7%, $Na_2O$ 0.3%, $K_2O$ 0.1%, $Li_2O$ 2.6%, MgO 2.8%, $Al_2O_3$ 17.9%, ZnO 1.0%, $TiO_2$ 4.8%, and $As_2O_3$ 0.9%. The batch was melted in a conventional glass melting unit operating at a maximum temperature of about 1600° C. and drawn into quarter-inch diameter cane. The drawn cane was cut into 4 inch lengths to provide suitable samples for subsequent heat treatment and strength measurement purposes.

The cane samples thus produced were converted from the glassy to the glass-ceramic state by heat treatment in accordance with the following schedule:

Heat at 300° C./hr. to 750° C.
Heat 100° C./hr. to 850° C.
Heat 300° C./hr. to 1080° C.
Hold 2 hours at 1080° C.
Cool rapidly to room temperature.

The structure of the crystallized cane samples was examined by means of X-ray diffraction analysis accompanied with transmission and replica electron microscopy. The cane was determined to be about 90% by weight crystalline made up of about 85% beta-spodumene and the remainder composed of rutile and an as yet unidentified magnesium aluminate phase.

As was noted above, the very high crystallinity of the glass-ceramic articles of this invention results in the residual glassy matrix being very small in quantity and having a composition very different from the parent glass since the components making up the crystals will have been precipitated therefrom. Therefore, in the preferred embodiment of the invention, substantially all of the alkali metal ions will be part of the structure of the beta-spodumene and other crystal phases present leaving a residual glassy matrix which is highly siliceous. Some alkali metal ion in excess of that included in the crystal phases can be tolerated but amounts greater than about 5% by weight in excess frequently result in a coarse-grained rather than the desired fine-grained article. A large excess of $Li_2O$ will also hazard spontaneous crystallization of the glass melt when being cooled and shaped. Hence, although in the preferred embodiment of the invention alkali metal ions are completely absent from the residual glassy phase, a very minor amount can be present therein. These "contaminant" ions in the residual glassy matrix can also, of course, be exchanged with the potassium ions during the subsequent ion exchange reaction but, inasmuch as the total glass content of the article is very small and the number of these ions is very small, the effect of such an exchange upon the properties of the article would be virtually negligible when compared to the exchange taking place in the beta-spodumene crystals.

The glass-ceramic cane samples were divided into sets of 6 samples each for ion exchange treatment in a molten salt bath. The salt bath was composed of a eutectic mixture of KCl and $K_2SO_4$, that is, a 52–48 weight percent mixture as described above. The bath was operated at a temperature of 720° C. and each group of cane samples was immersed for a time of 7 hours, this time-temperature schedule having been determined by experience to be particularly effective for strengthening purposes.

After removal from the bath and cleaning, the groups of samples were further heated in air in an electrically heated furnace, the time and temperature of the heat treatment being varied between groups of samples for purposes of comparison.

Following this subsequent heat treatment each heat treated cane sample was subjected to a severe form of surface abrasion wherein cane samples were mixed with 200 cc. of 30 grit silicon carbide particles, and subjected to a tumbling motion for 15 minutes in a Number 0 ballmill jar rotating at 90–100 rpm. Each abraded cane sample was then mounted on spaced knife edges in a Tinius Olsen testing machine and subjected to a continuously increasing load intermediate the supports until the cane broke in flexure. From the measured load required to break each cane a modulus of rupture (MOR) value was calculated for the individual cane and an average value determined for each set of samples. Since the strength of these treated articles is dependent upon the surface compression layer introduced therein through the ion exchange process and because substantially all service applications for these articles will contemplate some surface injury thereto even if only that suffered in normal handling and shipping, the permanent or practical strength demonstrated by these articles is that which is retained after considerable surface abrasion. Therefore, the above-described tumble abrasion test is one which was first developed by the glass industry to simulate the surface abuse which a glass article can experience in field service and is believed to be equally applicable with glass-ceramic articles. Preferably, the depth of the surface compression layer resulting from the ion exchange is at least 0.001 inch to secure a high abraded strength to the article. This layer depth can be determined quite readily by electron microscope examination of a cross-section of the article.

For comparison purposes, several additional groups of cane samples, produced from the glass described above and in accordance with the recited ceramming schedule, were subjected to a sodium ion exchange treatment. In accordance with this treatment, the cane samples were immersed for three hours in a molten salt bath composed of 85% $NaNO_3$ and 15% $Na_2SO_4$ and operated at a temperature of 475° C. After such treatment, the samples were cleaned and each group given a subsequent heat treatment similar in nature to that given to the potassium ion exchanged samples. Thereafter, the samples were abraded and their strength measured in identical fashion with that described for the potassium samples.

The following table is set up on the basis of the various heat treating schedules employed in terms of time and temperature with respect to both sodium and potassium ion exchanged samples. It presents the calculated average MOR in psi determined for each set of cane samples identified by their indicated particular thermal treatment. Zero time in each instance indicates a set of samples which was set aside without further thermal treatment to serve as a comparison standard.

| Ion | Temp. ° C. | Time (hours) | | | |
|---|---|---|---|---|---|
| | | 0 | 10 | 100 | 1000 |
| Na | 400 | 49,000 | 40,000 | 22,000 | 14,000 |
| Na | 500 | 43,000 | 25,000 | 12,000 | — |
| K | 500 | 47,000 | 47,000 | 43,000 | — |
| K | 600 | 47,000 | 49,000 | 34,000 | — |

From the table, it will be observed that the strength imparted to the sodium ion exchanged samples was substantially released by 100 hours treatment at 400° C. and essentially completely released in 1000 hours at this temperature. The average MOR value for an abraded cane prior to ion exchange is about 12,000 psi. At 500° C. substantial release occurs within 10 hours, and complete release in less than 100 hours. Such test results, together with corresponding practical test data as indicated later, have caused an operating temperature of about 400° C. to be established as the upper practical limit for ordinary application of beta-spodumene glass-ceramic articles strengthened by an exchange of sodium ions for lithium ions.

In contrast, it will be observed that, even at 600° C., the potassium ion exchanged samples underwent no measurable strength release in ten hours (the actual increase being within the limit of error involved) and retained a substantial portion of their strength even after 100 hours of operation. In general, this means that the thermal reliability, or maximum permissible operating temperature, for ion exchanged, beta-spodumene glass-ceramics is at least 200° C. higher for potassium ion exchanged articles than for sodium ion exchanged articles.

By way of translating this strength release data into the area of practical product application, a further test was conducted on 10 inch square sheets of the glass-ceramic material described above that had a thickness of about 0.135 inches. Such sheets are designed as a base for a heating element which is mounted on one side of the sheet. In operation, it is estimated that the maximum temperature reached in the glass-ceramic is on the order of 550°-600° C., but that such temperature is reached only periodically in an off-on cycling nature of operation. For determination of mechanical strength, a test prescribed by Underwriters Laboratories was selected which consists in dropping a 4 lb. metal vessel on the plate or sheet surface. To satisfactorily pass this test, an article must survive such vessel being dropped 10 times from a height of 6 inches.

At the start of such test, both sodium and potassium ion exchange plates easily passed the test as would be indicated from their relatively identical strengths on cane samples. After one week of test operation, however, the sodium ion exchanged samples consistently broke well below the prescribed 6 inch height of drop. In constrast, the initial failure in a group of potassium ion exchanged plates occurred at 3000 hours of operation.

From the above data, it will be readily apparent that the present invention provides a mechanically strengthened glass-ceramic article having a unique and highly advantageous property of strength retention under relatively high temperature operation. It will be appreciated that variations in the absolute results will occur with variations in the materials and treating conditions employed, but that the general principles of strengthening described above are obtained generally in beta-spodumene glass-ceramic articles.

Although the recited examples utilized a bath of molten potassium salt and this is the preferred means for carrying out the ion exchange reaction, it can be appreciated that other sources of exchangeable potassium ions can be employed which are operable at the temperatures required in this invention. For example, pastes and vapors are well-known media in the ion exchange staining arts. Further, while the most rapid rates of exchange and the highest strengths will normally be effected where pure potassium ion-containing materials are employed as the exchange source, some contamination thereof can be tolerated. However, the determination of the maximum amount of contamination which can be tolerated is believed to be well within the technical acumen of a person of ordinary skill in the art.

As has been discussed above, this invention is founded upon the exchange of potassium for lithium ions in beta-spodumene with accompanying expansion of the spodumene phase and formation of the low density, high volume phase, cristobalite. Thus, at least a part of the lithium ions in the beta-spodumene is replaced by potassium ions but the crystals of the major phase still retain the essential structure of beta-spodumene. That such an exchange does indeed occur, however, is illustrated through an X-ray diffraction analysis of the surface crystals prior to and after the ion exchange reaction. This replacement of lithium ions by potassium ions is demonstrated in the following table which reports several of the d-spacings and the intensities observed thereat in an X-ray diffraction pattern made of the surface crystallization of the glass-ceramic example before and after the ion exchange reaction. The intensities are arbitrarily designated as very strong (vs), strong (s), moderate (m), and weak (w). The development of a cristobalite phase during the ion exchange reaction is illustrated by the d-spacing at 4.08. In this Example, the amount of cristobalite was determined to be about 10%. The peaks indicative of rutile and the unidentified magnesium aluminate phase have not been included since the intensities of both were very weak.

| Before Exchange | | 52% KCl-48% $K_2SO_4$ 7 Hours at 720° C. | |
|---|---|---|---|
| d | I | d | I |
| 5.75 | w | 5.91 | w |
| 4.57 | m | 4.57 | w |
| — | — | 4.08 | m (cristobalite) |
| 3.87 | s | 3.85 | m |
| 3.44 | vs | 3.47 | vs |
| 3.25 | w | 3.25 | w |
| 3.14 | m | 3.14 | w |
| 2.44 | w | 2.44 | w |
| — | — | 1.96 | w (cristobalite) |
| 1.92 | m | 1.92 | w |
| 1.86 | s | 1.87 | w |
| 1.69 | w | 1.69 | w |

It is believed that this table amply illustrates the retention of the fundamental beta-spodumene crystal structure and the formation of a minor amount of a cristobalite phase during the ion exchange process. Thus, the peaks in the diffraction pattern which are characteristic of the beta-spodumene crystals before the ion exchange are maintained after the exchange but their spacing and intensity vary significantly, thereby reflecting a distortion and expansion of the structure of the crystal cell but not the destruction thereof. The maximum amount of cristobalite observed has been less than 15%.

Finally, inasmuch as there are substantially no lithium ions in the residual glassy matrix, the integral surface compression layer formed in the glass-ceramic article must be the result of ion exchange within the beta-spodumene crystals in this surface layer. While, as has been explained above, beta-spodumene is the predominant crystal phase grown within the glass-ceramic article, minor amounts of other crystals can also be present. However, since the presence of such extraneous crystals can dilute the maximum strengthening effect which can be achieved where beta-spodumene is the only crystal phase, it is preferred to retain the sum of any such incidental crystallization to less than about 20% of the total crystallization.

We claim:

1. A method for producing a unitary glass-ceramic article of high strength wherein the crystal content thereof constitutes at least 50% by weight of the article with a surface compressive stress layer and an interior portion which comprises contacting a glass-ceramic article consisting essentially of $Li_2O$, $Al_2O_3$, and $SiO_2$, wherein the crystal phase therein consists essentially of beta-spodumene at a temperature between about 550°–800° C. with a source of potassium ions for a period of time sufficient to replace at least part of the lithium ions of said beta-spodumene in a surface layer of the article with a corresponding amount of potassium ions, said replacement not changing the essential crystal structure of the beta-spodumene crystals to thereby effect a compressively stressed surface layer on the article.

2. A method according to claim 1 wherein said time sufficient to replace at least part of the lithium ions of said beta-spodumene does not exceed about 16 hours.

3. A method according to claim 1 wherein said glass-ceramic article is contacted with said source of potassium ions at a temperature between about 700°–800° C.

4. A unitary glass-ceramic article of high strength wherein the crystal content thereof constitutes at least 50% by weight of the article with a surface compressive stress layer and an interior portion consisting essentially of $Li_2O$, $Al_2O_3$, and $SiO_2$, wherein the crystals of said interior portion consist essentially of beta-spodumene and the crystals of said surface compressive stress layer consist essentially of beta-spodumene, the crystal structure of said latter crystals being essentially unchanged but in at least a portion of which the proportion of lithium ions is less with a corresponding increase in an amount of potassium ions.

* * * * *